UNITED STATES PATENT OFFICE.

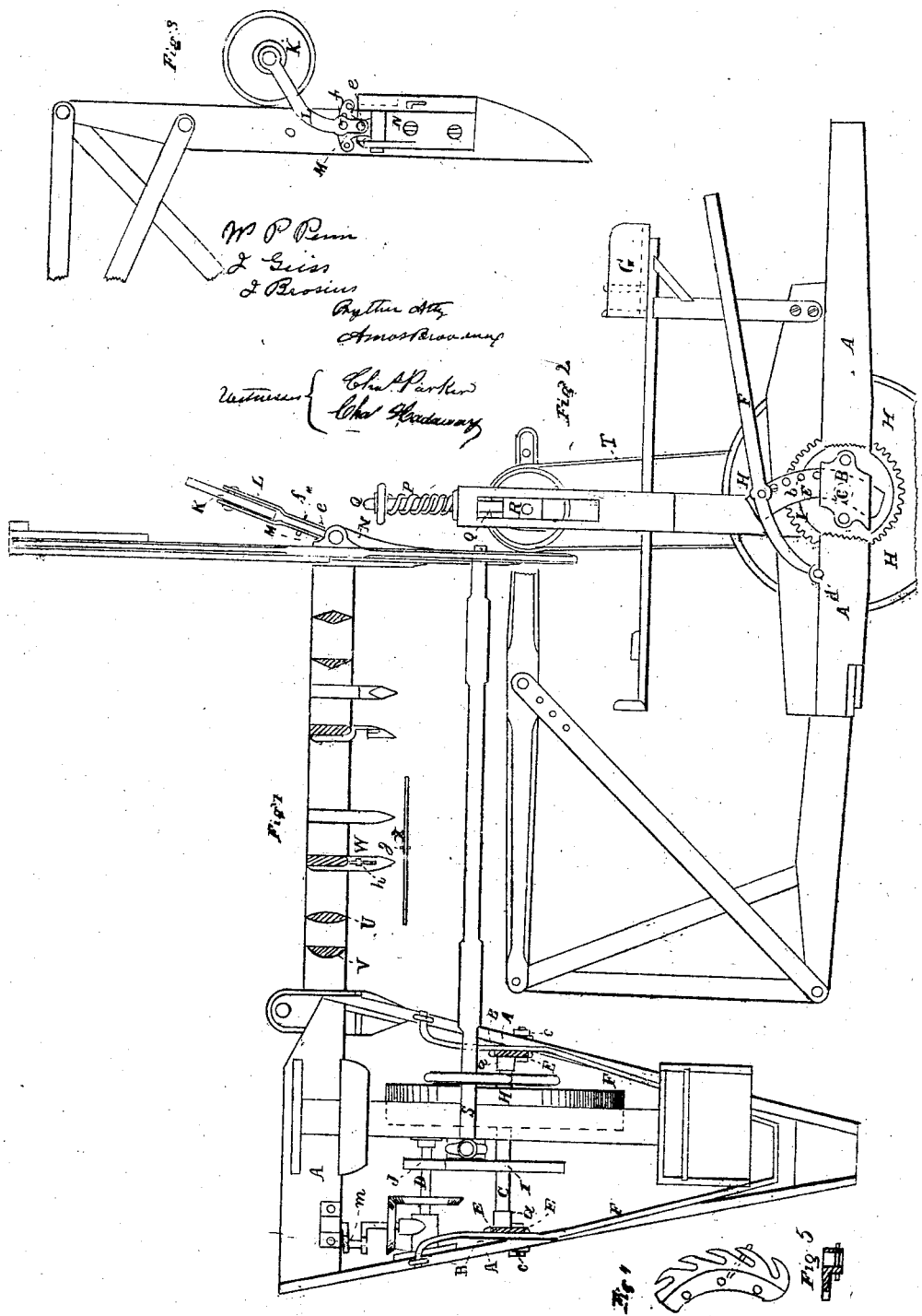

WORDEN P. PENN, JACOB GEISS, AND JACOB BROSIUS, OF BELLEVILLE, ILL.

IMPROVEMENT IN HARVESTERS.

Specification forming part of Letters Patent No. 35,836, dated July 8, 1862.

*To all whom it may concern:*

Be it known that we, WORDEN P. PENN, JACOB GEISS, and JACOB BROSIUS, of Belleville, in the county of St. Clair and State of Illinois, have invented certain new and useful Improvements in Reaping and Mowing Machines; and we do hereby declare the following to be a full, clear, and exact description of the same, reference being had to the annexed drawings, making part of this specification, in which—

Figure 1 is a top view, and Fig. 2 a side elevation, of a reaper and mower to which our improvements are applied; and Figs. 3, 4, and 5 are detached parts of the same.

To enable others skilled in the arts to which our improvements appertain to make and use the same, we will proceed to describe them, their objects, and the manner of their operation.

Like letters represent like parts of the different figures in the drawings, the main frame being represented by A.

The objects of our improvements are, first, to provide a reaping and mowing machine with a more simple, cheap, and efficient means for raising and lowering the cutting apparatus, and for holding it to the desired height from the ground, or for letting it drag on the ground, without disuniting the operating-gearing. To this end we bolt to the inside of the main frame two brackets, B; in the inside face whereof a circular groove is made, with a radii equal to the distance between the centers of the main axle C and the counter-shaft D. In the aforesaid groove we arrange the circular plates E, on the inside faces whereof hubs $a$ are made to receive the journals of the main axle. The said circular plates are perforated near one edge, as shown by $b$, and a hole is also made through the bracket and the side frame-piece, through which a bolt, $c$, is put, whereby the plate is secured to the bracket in the desired position. In Fig. 2 the frame is broken out to more fully show the bracket. To the circular plates E we attach levers F, the long ends whereof are brought forward and united under the driver's seat G, as shown in Figs. 1 and 2. The point of attachment between the levers and the plates forms the fulcrums of the levers. The short ends of the levers are hinged to the frame at $d$, a distance from the fulcrum about equal to the radii of the plates. The point of attachment between the levers and the frame may, of course, be extended from the fulcrum by making an oblong hole in the levers where they connect to the fulcrum, so as not to interfere with the circular movement of the plates. By these means the truck-wheel becomes the real fulcrum of the levers, so that by removing the bolts $c$ and pressing down on the levers the frame and cutting apparatus will be raised up, the brackets sliding up on the circular plates, keeping the driving-wheel I always in gear with the pinion J, the shaft of the wheel I forming the center around which the pinion moves, thus furnishing the driver with a complete and easy means of raising and lowering the cutting apparatus while the machine is in motion, for the brackets, instead of being bolted to the plates, may simply hang on lugs made thereon, so that the driver may with his feet raise the frame and cutting apparatus, by which he can avoid any small obstruction that may lie in the path of the machine when mowing grass close to the ground. The main frame and the near end of the cutting apparatus are raised, lowered, and supported by the above-described arrangement of devices; but to adjust the outer end of the cutting apparatus and the platform to correspond with the height of the main frame we have contrived a new style of adjustable caster-wheel, which consists of but few parts and is very simple and efficient. The said caster-wheel is shown by K, and its supporting-arm by L, which is pivoted to the sector M at $e$. The said sector is hinged in lugs made on the outside of the shoe N, so as to swing on a horizontal plane. In the sector, near its periphery, a series of holes are made to correspond with the hole in the arm, in which a pin, $f$, is put to hold it in the required position. By these means the outer end of the cutting apparatus can be raised and lowered to correspond with the near end, and the caster-wheel can run close beside the frame-piece $o$ of the platform, at the same time allowing it all the different movements necessary to the fulfillment of its functions as the machine moves in the different directions. In case experience shows it to be necessary or advantageous, we propose to use the circular plate, (shown in Figs. 4 and 5,) with hook journal-boxes made in its periphery, as a substitute for the plate E, and for substantially the same purpose and in the same relation to the main axle and frame.

The object of our improvements is, second, to provide the belt T, which drives the reel of a reaping and mowing machine, with a cheap and simple yielding tightener. To this end we place a spiral spring, P, around the adjusting-screw Q, attached to the journal-box R, which supports the journal of the reel-shaft S. By these means the end of the reel-shaft hangs upon the spring, so that in case the belt shrinks, twists, or kinks it will still continue to operate well.

To facilitate the movement of the cutting apparatus of a reaping and mowing machine over the ground when cutting grass, we make the finger-beam oval or half-oval, as shown by V and U, by which means the cutting apparatus is made lighter and moved over the ground, either backward or forward, with less power and with less liability to strike small obstructions than if made wedge-shaped or flat on its bottom side.

To prevent the trash from entering into the guard-finger from either above or below, so as to choke the sickle, and also to provide a more efficient means of cleaning out such trash as may unavoidably enter from the side of the finger in the path of the sickle, we make the guard-finger with a closed smooth surface, both top and bottom, making only a narrow slit in it for the sickle to work in, as shown by W. To clean the trash out of this slit more effectually, we put small pins $g$ in the sickle X, and let them project a short distance on both sides thereof, and make an opening above and below the sickle in the finger for the said pin to work in, as shown by $h$. By these means very little trash gets in the finger, and that little is effectually cleaned out.

To sustain the connecting-rod which operates the sickle of a reaping and mowing machine in a line therewith, and to keep the journal-box thereof from being cut out by the shoulder of the crank, thus perfecting the operation of this part of the machine and increasing its durability, we make an unusually large flange or collar, $m$, on the lower end of the crank-pin, so that when the machine is used for mowing and its back end is the lowest, and the journal-box of the rod falls against the lower collar of the crank, it will be supported by a large surface, thus preventing the box from being cut out and the rod from falling out of line. The connecting-rod is of the ordinary construction, and is therefore not shown in the drawings, and needs no description.

1. The bracket B, the circular plate E, the main shaft C, the lever F, the main frame A, and the driver's seat G, arranged in respect to each other, substantially in the manner described, for the purpose specified.

2. In combination with the reel-post and shaft S, journal-box R, and screw Q, the spring P, as shown and described, for the purpose specified.

3. We do not claim, broadly, the use of an adjustable joint or elbow in the arm of the caster-wheel, as such a joint is found in the arm of the caster-wheel patented to Lambert Erpelding October 1, 1861; but what we do claim is adjusting the caster-wheel K by means of the perforated arms L, perforated segment M, and pin $f$, in the manner and for the purpose shown and described.

W. P. PENN.
JACOB GEISS.
JACOB BROSIUS.

Witnesses:
G. GEORGE,
F. D. BELCOUR.